US007913025B1

(12) United States Patent
Chamseddine et al.

(10) Patent No.: US 7,913,025 B1
(45) Date of Patent: *Mar. 22, 2011

(54) METHOD AND SYSTEM FOR A STORAGE DEVICE

(75) Inventors: Ahmad Chamseddine, Round Rock, TX (US); Brian Bruce, Austin, TX (US)

(73) Assignee: Augmentix Corporation, Austin, TX (US)

( * ) Notice: Subject to any disclaimer, the term of this patent is extended or adjusted under 35 U.S.C. 154(b) by 190 days.

This patent is subject to a terminal disclaimer.

(21) Appl. No.: 12/175,496

(22) Filed: Jul. 18, 2008

Related U.S. Application Data (60) Provisional application No. 60/961,595, filed on Jul. 23, 2007.

(51) Int. Cl.
*G06F 13/00* (2006.01)
(52) U.S. Cl. ........................... 710/315; 710/310
(58) Field of Classification Search ............... 710/310, 710/315; 711/154, 163, 202
See application file for complete search history.

(56) References Cited

U.S. PATENT DOCUMENTS

| | | | |
|---|---|---|---|
| 5,708,668 A | 1/1998 | Styczinski | |
| 6,834,324 B1 | 12/2004 | Wood | |
| 6,973,516 B1 | 12/2005 | Athanas et al. | |
| 7,107,385 B2 | 9/2006 | Rajan | |
| 7,213,095 B2 * | 5/2007 | Middleton | 710/310 |
| 7,472,219 B2 * | 12/2008 | Tamura et al. | 711/103 |
| 2002/0194428 A1 | 12/2002 | Green | |
| 2004/0123017 A1 | 6/2004 | Henry et al. | |
| 2005/0010722 A1 | 1/2005 | Chen | |
| 2005/0125602 A1 * | 6/2005 | Ehrlich | 711/112 |
| 2005/0125603 A1 * | 6/2005 | Ehrlich | 711/112 |
| 2005/0132040 A1 | 6/2005 | Ellis et al. | |
| 2005/0157752 A1 | 7/2005 | Takase et al. | |
| 2006/0224852 A1 | 10/2006 | Kottomtharayil | |
| 2006/0248292 A1 | 11/2006 | Suresh | |
| 2007/0074292 A1 | 3/2007 | Mimatsu | |
| 2007/0250662 A1 * | 10/2007 | Yoshida et al. | 711/113 |
| 2010/0070688 A1 * | 3/2010 | Lin | 711/103 |

OTHER PUBLICATIONS

Office Action issued in U.S. Appl. No. 12/048,256, mailed Dec. 22, 2009, 8 pgs.
Office Action issued in U.S. Appl. No. 12/048,271, mailed Feb. 4, 2010, 8 pgs.
Office Action issued in U.S. Appl. No. 12/175,490, mailed Mar. 31, 2010, 8 pgs.
Office Action for U.S. Appl. No. 12/175,490 mailed Aug. 19, 2010, 6 pgs.
Office Action for U.S. Appl. No. 12/048,271 mailed Aug. 31, 2010, 12 pgs.
Office Action for U.S. Appl. No. 12/048,256 mailed Sep. 2, 2010, 12 pgs.
Office Action Mailed Feb. 2, 2011 in U.S. Appl. No. 12/048,256. 10 pgs.
Office Action Mailed Feb. 2, 2011 in U.S. Appl. No. 12/048,271. 10 pgs.

* cited by examiner

*Primary Examiner* — Glenn A Auve
(74) *Attorney, Agent, or Firm* — Sprinkle IP Law Group (57) ABSTRACT

Systems and methods for storage devices are presented. More specifically, in one embodiment a storage device may comprise an enclosure comprising an interface which may be coupled to an I/O bus of a computing system with which it is being utilized. Commands may be received through the interface and, invisibly to the computing system which issues the commands, translated into a set of commands configured to effectuate the received command in conjunction with one or more storage media coupled to the interface. These storage media may comprise different types of storage media such that data designated as critical may be stored on an appropriate storage media.

20 Claims, 6 Drawing Sheets

METHOD AND SYSTEM FOR A STORAGE DEVICE

RELATED APPLICATIONS

This application claims a benefit of priority to the filing date of U.S. Provisional Patent Application Ser. No. 60/961,595 by Brian Bruce and Ahmad Chamseddine, entitled "Method and System for Utilizing Multiple Storage Devices" filed on Jul. 23, 2007, the entire contents of which are hereby expressly incorporated by reference for all purposes.

TECHNICAL FIELD

Embodiments of the invention relate generally to the use of storage devices. More particularly, embodiments of the invention relate to implementing storage devices with multiple types of storage media. Even more specifically, embodiments of the invention relate to implementing storage devices with multiple storage media to achieve one or more desired objectives to achieve greater data reliability or other objectives such as increased capacity, speed, security, a more desirable form factor, or another objective altogether.

BACKGROUND

Data represents a significant asset for many entities. Consequently, data loss, whether accidental or caused by malicious activity, can be costly in terms of wasted manpower, loss of goodwill from customers, loss of time and potential legal liability. To ensure proper protection of data for business, legal or other purposes, many entities may desire to protect their data using a variety of techniques, including data storage, redundancy, security, etc. These techniques may, however, conflict with other competing constraints or demands imposed by the state or configuration of computing devices used to process or store this data.

These types of constraints may center around processing constraints particular to an environment or context in which data is being processed or utilized, space constraints within such an environment, cost constraints placed on the hardware or software used to process, manage or otherwise store data, or other constraints altogether may impede the ability to achieve desirable levels of protection with respect to important data. It would be desirable therefore, to be able to achieve a desired level of data protection utilizing solutions which may account for, or be less affected by, certain of these constraints.

SUMMARY

Systems and methods for storage devices are presented. More specifically, in one embodiment a storage device may comprise an enclosure including an interface which may be coupled to an I/O bus of a computing system with which it is being utilized. Commands may be received through the interface and, invisibly to the computing system which issues the commands, translated into a set of commands configured to effectuate the received command in conjunction with one or more storage media coupled to the interface, where this set of commands may also be configured to store critical data on an appropriate storage media.

Embodiments of the invention disclosed herein can be implemented all or in part by logic, including hardware or by programming one or more computer systems or devices with computer-executable instructions embodied in a computer-readable medium. When executed by a processor, these instructions operate to cause these computer systems and devices to perform one or more functions particular to embodiments of the invention disclosed herein. Programming techniques, computer languages, devices, and computer-readable media necessary to accomplish this are known in the art and thus will not be further described herein.

Certain technical advantages may be obtained through the use of embodiments of the present invention. More specifically, embodiments of the present invention may allow increased reliability of critical data by allowing critical data to be stored on a more reliable storage media while simultaneously providing increased capacity as the reliable storage media may be utilized in conjunction with a storage media with relatively greater capacity. Furthermore, increased throughput may also be realized in conjunction with the obtaining increased reliability by allowing multiple storage media to be utilized in conjunction with certain buses (where only one drive may have been utilized previously) to minimize latency on the bus and maximize throughput.

Additionally, embodiments of the present invention may be operating system and bus agnostic, any bus can be utilized and increased reliability, security, extra capacity, etc. can be implemented or obtained regardless of a native bus format. Thus, functionality provided by embodiments of the present invention may be obtained without modification to drivers or other software on native systems.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

DETAILED DESCRIPTION

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented at least in part using suitable computer-executable instructions that may reside on a computer readable medium (e.g., a HD), hardware circuitry or the like, or any combination. Before proceeding with the remainder of the disclosure it may be helpful to review U.S. patent application Ser. No. 12/048,256, entitled "Method and System and Apparatus for Use in Data Storage", Brian Bruce and Ahmad Chamseddine, filed Mar. 14, 2008, U.S. patent application Ser. No. 12/048,271, entitled "Method and System for a Storage Device", Brian Bruce and Ahmad Chamseddine, filed Mar. 14, 2008 and U.S. patent application Ser. No. 12/175,490, entitled "Method and System for Utilizing Multiple Storage Devices", Brian Bruce and Ahmad Chamseddine, filed Jul. 18, 2008, all of which are incorporated fully herein by reference.

As discussed above, data represents a significant asset for many entities. Consequently, data loss, whether accidental or caused by malicious activity, can be costly in terms of wasted manpower, loss of goodwill from customers, loss of time and potential legal liability. To ensure proper protection of data for business, legal or other purposes, many entities may desire to protect their data using a variety of techniques, including data storage, redundancy, security, etc. These techniques may, however, conflict with other competing constraints or demands imposed by the state or configuration of computing devices used to process or store this data.

Figure 1:
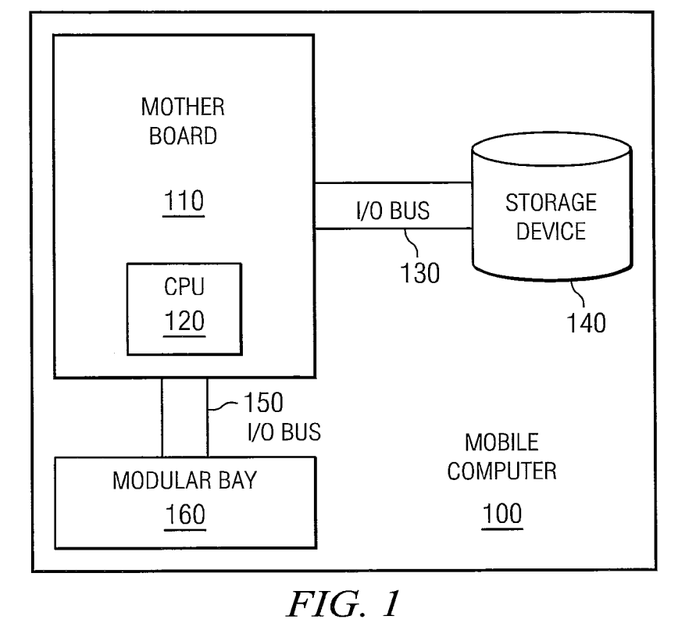
FIG. 1 is a block diagram of one embodiment of a mobile computer.

This tension may be better understood with reference to FIG. 1 which depicts a high level overview of one embodiment of an architecture for a mobile computer (e.g. also sometimes referred to as a notebook or laptop computer). A mobile computer 100 comprises a mother board 110 with a Central Processing Unit (CPU) 120 where the mother board is coupled to a storage device 140 (e.g. a hard disk drive, solid state storage such as flash memory or the like, media library of tape drives, other type of storage media such as disk platters, etc., the terms storage device and storage media will be used interchangeably throughout) through an I/O bus 130 (e.g. an ATA bus, such as a SATA or PATA bus, a PCI bus, a SCSI bus or any other type of bus). Thus, data processed by, or otherwise utilized in conjunction with, mobile computer 100 may be stored in storage device 140.

However, storage device 140 may only be of a certain capacity. In other words current technical limitations of the storage device may only allow a particular type of storage device 140 to store a certain amount of data (referred to as the capacity of the storage device). For example, the largest capacity hard disk drive may be around 750 gigabytes. Part and parcel with this limitation, the capacity of storage device 140 may further be limited by the physical constraints imposed by the packaging of mobile computer 100. There may only be a limited amount of space in which to place storage device 140. In many cases, this additional limitation further constrains the capacity of storage device 140 which may be utilized in this physical package (as the physical size of a storage device may be related to its capacity). For example, the largest disk drive that is currently in use in mobile computers is around 160 gigabytes.

Consequently, the amount of data which may be stored in conjunction with mobile computer 100 is limited by the capacity of storage device 140. This limitation exists, in part, because in most cases I/O bus 130 may only allow (e.g. is configured or designed to operate with) one storage device to be coupled to the I/O bus 130. Thus, the capacity of storage device 140 (which itself may be constrained by technological limitations or the physical limitations imposed by the packaging of mobile computer 100) may be the biggest gating factor in the amount of data which may be stored by mobile computer 100.

The utilization of only one storage device 140 may also give rise to other conflicts. For example, in most cases the largest capacity disk drive for use in mobile computers, as discussed above, is around 160 gigabytes. This type of disk drive is a spinning media type of storage device. In other words, a set of spinning platters is used to store and retrieve data. While somewhat secure this type of storage device is relatively prone to data loss or failure compared with other types of storage media such as solid state storage devices. Thus, in certain cases users of mobile computer 100 may desire to use a disk drive as storage media 140 to increase the amount of data that may be stored. Other users of mobile computer 100 may, however, be dealing with highly critical data and desire to use a solid state (or other more reliable) storage device as storage device 140 to enhance the protection of such data. Both of these options entail a large degree of compromise, if more capacity is desired a disk drive may be chosen as storage device 140, compromising the reliability of data stored on storage media 140 while if more reliability is desired solid state storage may be chosen for storage device 140, compromising the amount of storage available.

Mobile computer 100 may, however, also comprise a second I/O Bus 150 coupled to mother board 110, where the second I/O Bus 150 interfaces with a modular bay 160. A variety of devices may be inserted into (e.g. interfaced with), or used in conjunction with, modular bay 160. For example, a CD or DVD drive may be utilized in conjunction with modular bay 160, a floppy disk drive or another type of storage device such as a hard disk or the like may also be utilized in conjunction with modular bay 160. Consequently, in order to expand the amount of data which may be stored in conjunction with mobile computer 100 or utilize another type of storage device to increase data reliability, in many cases modular bay 160 may be utilized in conjunction with a second storage device in addition to storage device 140. Utilizing the modular bay 160 of mobile computer 100 may, however, preclude the use of modular bay 160 for interfacing with another desired device (e.g. DVD or CD drive), may entail constant swapping between the second storage device and another desired device or may require a user to carry multiple additional devices.

Similar types of problems may present themselves in other computing devices or systems which utilize storage devices, such as enterprise servers, storage servers, storage area networks (SANs), network attached storage (NAS) systems, or the like. These types of problems may be better illustrated with reference to FIG. 2 which depicts a block diagram of one embodiment of a computer storage system. Storage system 200 comprises a storage server 230 which receives commands or instructions over I/O bus 210, which may be a type of serial bus such as fiber channel, SCSI or the like, but may also be any type of I/O bus known in the art. Based on the commands or instructions received over I/O bus 210, storage server 230 may communicate with one or more of storage devices 240 (e.g. hard disk drives, tape drives, optical drives, solid state storage devices, etc.) to write, read or otherwise operate on, data associated with those storage devices 240. These communications may take over an I/O bus 220 corresponding to the storage device 240, where each of these I/O buses 220, may in turn, be different, for example I/O bus 220a may be a SCSI bus, I/O Bus 220b may be a serial ATA bus, etc.

Figure 2:
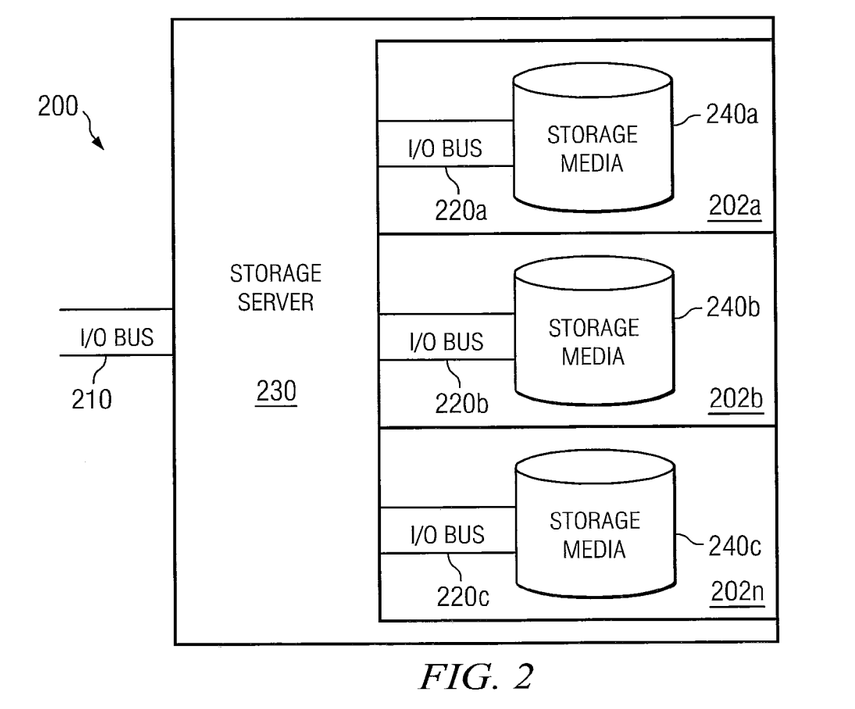
FIG. 2 is a block diagram of one embodiment of a storage server.

In most cases, however, no matter the type of I/O bus utilized, the I/O bus 220 may limited to being coupled only to one storage device 240 or type of storage device 230 (e.g. a storage device may comprise multiple physical tape drives or other storage mediums). As can be seen, this limitation may constrain the storage associated with storage server 230 to the number of I/O buses 220 associated with storage router 230 or the type and size of storage devices 240 associated with each of I/O buses 220 similarly to the limitations described above with respect to a mobile computer.

Exacerbating these limitations is the fact that, in some cases, storage devices 240 may be proprietary to a particular manufacturer of storage server 230. This is because storage server 230 may be designed such that it has one or more slots 202 into which storage device 240 may be inserted, plugged or otherwise connected. As storage servers 230 may be designed for a variety of goals or objectives, different storage servers may have different designs and thus the slots 202 into which storage media 240 may be plugged may be different. These types of storage devices 240 are sometimes referred to as field replaceable units (FRU), or the like.

In most cases, then, manufactures design proprietary enclosures for storage device 240, such that the storage device 240 comprises a proprietary enclosure housing one or more storage media (such as a hard disk of the type known in the art such as those manufactured by Seagate, Western Digital, Samsung, etc.). These storage devices 240 can then be utilized in conjunction with a storage server 230 from the same manufacturer, or another manufacturer using the same type of enclosure housing. Thus, once again one limiting factor is the capacity of storage devices 240 designed for that storage server (e.g. utilizing an enclosure compatible with the storage server 230).

Thus, to increase capacity, in most cases a disk drive is used in storage device 240. While somewhat secure disk drives are relatively prone to data loss or failure compared with other types of storage media such as solid state storage devices. In most cases, however, users of storage server 230 cannot afford the loss of capacity that the use of solid state storage as storage media 240 would entail. As a result disk drives may be utilized in storage devices 240 and the loss of data protected against in other ways, such as redundancy, RAID, etc. which may entail additional overhead or expense.

To remedy the aforementioned deficiencies, problems and limitations, among others, attention is now directed to systems, methods and apparatuses for storage devices which have allow the use of multiple storage media in a single storage device to increase the reliability of the data stored and which may result in increased capacity, speed, security, a more desirable form factor or myriad other advantages relative to other storage devices. More specifically, embodiments of such storage devices may interface with a single bus (e.g. a single point of connection to a bus) and allow this single bus to be interfaced with multiple buses invisibly to devices using the single bus. By allowing multiple buses to be interfaced to the single bus, a number of storage media may be coupled to each of the buses where at least two of the storage media may be of different types, increasing the reliability of critical data stored on one of the storage media which increasing the maximum storage capacity, speed, etc. of the storage device in general relative to the coupling of a storage device with only a single storage media to the single bus, without using any additional buses or slots (e.g. in a storage server or on a bus).

Advantageously, in one embodiment, the increased reliability of data and other advantageous capabilities may be obtained substantially without alterations to any of the other hardware or software of systems with which it utilized, and to that hardware or software the single storage device comprising the multiple buses (and multiple attached storage media of different types) may appear as a single storage device on the bus.

Figure 3:
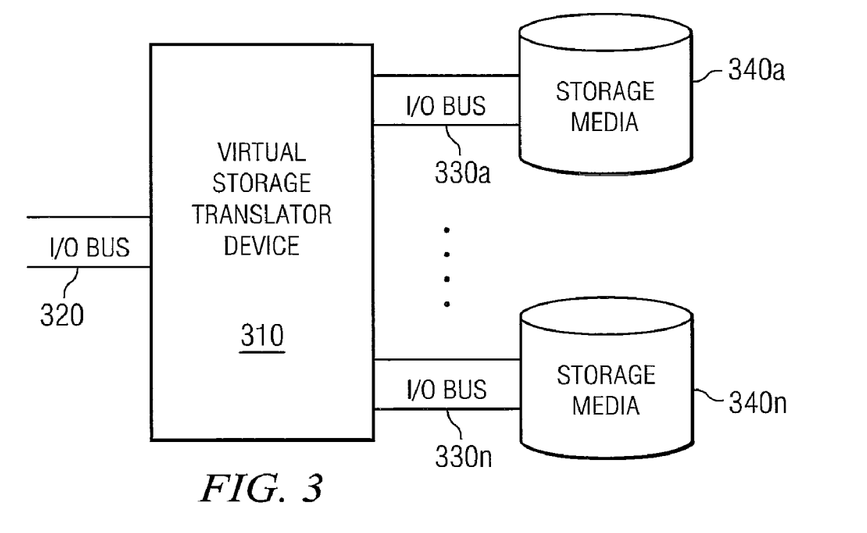
FIG. 3 is a block diagram of one embodiment of a virtual translator storage device.

Moving now to FIG. 3, a block diagram for one embodiment of a system for interfacing multiple buses with a single bus is depicted. More specifically, virtual storage translator device 310 may allow a primary T/O bus 320 to be interfaced with multiple secondary I/O buses 330. I/O bus 320 may be almost any type of bus known in the art, such a SATA or PATA bus. Virtual storage translator device 310, may be a standalone ASIC, a field programmable gate array (FPGA), a circuit board comprising one or more ASICs operable to execute computer readable instructions, a set of computer readable instructions, some combination of hardware and software, etc. In one embodiment, virtual storage translator device 310 may use one or more ASICs such as the Silicon Image Si5723 Storage Processor.

This virtual storage translator device 310 is operable to receive commands or instructions (used interchangeably herein) on primary I/O bus 320 and translate or map these commands or instructions such that they are effectuated with respect to storage media 340 on secondary I/O buses 330, where secondary I/O buses 350 may each be a different type of I/O bus (e.g. SATA, PATA, SCSI, FC, etc.) and secondary I/O buses 330 may be the same or different from primary I/O bus 320. This translator or mapping may for example, entail tracking where various files are stored or translating commands or instructions in one protocol to equivalent commands or instructions in another protocol.

Furthermore, this translator or mapping process may be accomplished seamlessly or invisibly with respect to a computing device or processor which issues the commands or instruction over I/O bus 320. In other words, in some embodiments, to a computing device interfacing with I/O bus 320 it appears as if a single storage device is present on I/O bus 320 where this single storage device may have the capacity of the combined capacity of the storage media 340 coupled to each of I/O buses 330.

Figure 4:
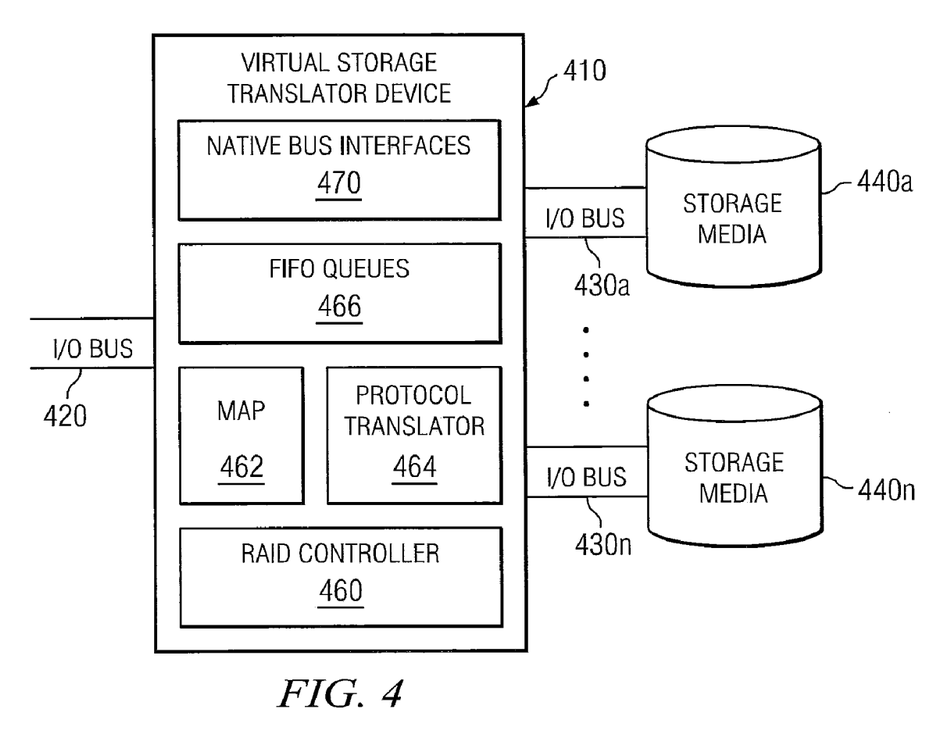
FIG. 4 is a block diagram of one embodiment of a virtual translator storage device.

A more detailed depiction of one embodiment of a system for interfacing multiple buses with a single bus is depicted is depicted in FIG. 4. More specifically, virtual storage translator device 410 may allow a primary T/O bus 420 to be interfaced with multiple secondary I/O buses 430 where secondary I/O buses 430 may each be a different type of I/O bus (e.g. SATA, PATA, SCSI, FC, etc.) and secondary I/O buses 430 may be the same or different from primary I/O bus 420. Each of secondary I/O buses 430 is coupled to a storage media 440 where one of the storage media 440a may be of a first type of storage media such as a disk drive while another of the storage media 440*n* may be of a second type of storage media such as solid state storage.

Thus, virtual storage translator device 410 may be operable to receive commands or instructions on primary I/O bus 420 and translate these commands or instructions such that they are effectuated with respect to storage media 440 on secondary I/O buses 430 or to receive responses or data on a secondary I/O bus 430 and translate the response or data such that it can be communicated to a recipient (e.g. issuer of a command) on primary I/O bus 420. The translation of these commands or responses from the protocol in which they are received on a bus (e.g. primary I/O bus 420 or a secondary I/O bus 430) to a suitable protocol may be accomplished by using native bus interfaces 470 (e.g. an interface corresponding to primary I/O bus 420 or one or more of secondary I/O buses 430) and protocol translator 464.

Additionally, virtual storage translator device 410 is operable to ensure that certain critical data may be stored on an appropriate storage media 440. The storage of critical data on a particular storage media 440 may be accomplished seamlessly or invisibly with respect to a computing device or processor which issues the commands or instruction over I/O bus 420. Virtual translator storage device 410 may simulate a single drive which is the combined size of storage media 440 by performing or executing the commands received on primary I/O bus 420 utilizing storage media 440. In other words, in some embodiments, to a computing device interfacing with I/O bus 420 it appears as if a single storage device is present on I/O bus 420. Portions of the functionality utilized to implement all or a portion of the described functionality may utilize a set of computer readable instructions of one or more ASICs such as the Silicon Image Si5723 Storage Processor.

In this embodiment, two storage media 440 of different types may be utilized in conjunction with an I/O bus 420 designed to interface with only a single storage device and designated data may be stored on one of the storage media 440 such that certain data may be stored on a storage media 440 which provides more reliable storage of such data, without altering the BIOS or other software of a system with which it is being utilized. In fact, to a system with which it being utilized it appears as if a single storage device is present on I/O bus 420.

Map 462 may be utilized to ensure that critical data is stored on an appropriate storage media 440. Map 462 may comprise a set of address corresponding to one or more storage media 440 on which critical data is to be stored. Thus, when a command received over I/O bus 420 indicates that stored data is critical this data may be stored at one of the address corresponding to one of the storage media 440 on which critical data should be stored. Alternatively, map 462 may comprise a set of addresses corresponding to the addressing utilized in conjunction with commands issued over I/O bus 420 where the set of address correspond to critical data. When a command is received over I/O bus 420 to store data at an address if the referenced address is within the set of address maintained by map 462 which correspond to critical data the received data may be stored at one of the set of addresses corresponding to the one or more storage media 440 on which critical data is to be stored.

As can be seen then, storage capacity corresponding to I/O bus 420 may effectively be increased and the reliability of critical data improved without any substantial alteration to the hardware or software of a computing system using a storage device comprising virtual translator storage device 410 (relative to coupling only a single storage device to I/O bus 420). In other words, no matter the size of a single storage device which can be coupled to I/O bus 420, this size can be effectively increased and the storage of critical data on reliable storage media achieved by using a storage device with virtual translator storage device 410 and attaching multiple storage media 440 of different types to virtual translator storage device 410.

In addition to providing the ability to have a storage device with differing types of storage media in order to ensure the reliability of data, virtual translator storage device 410 may also comprise RAID controller 460 which may be hardware (e.g. on an ASIC), a portion of the hardware or ASIC comprising virtual storage translator device 410, computer readable instructions on a computer readable media, or some combination. RAID controller 460 may be operable to implement one or more RAID levels (e.g. RAID levels 0, 1, 3, 4, 5, 6 or any nested RAID levels, etc.), multi-RAID modes (e.g. implementations which create virtual volumes and balance the benefits of capacity and protection) cascaded storage devices and the like. In other words, in one embodiment, RAID controller 460 handles the management of any RAID implementation in conjunction with the storage devices coupled to secondary I/O buses 430, performing any parity calculations required by an implemented level RAID level or executing other processing utilized for the RAID implementation.

This management may, in one embodiment, include maintaining one or more first in first out (FIFO) queues 466 for buffering or holding received commands until they are processed and map 462 which is a map between the addressing utilizing in conjunction with commands issued over I/O bus 420 and the storage of data with respect to storage media 440. For example, if RAID controller is implementing RAID 0 with respect to storage media 440, all of storage media 440 may appear a contiguous set of addresses to users of I/O bus 420 and thus commands over I/O bus 420 may attempt to store or otherwise access data according to these contiguous addresses. To implement RAID 0, however, this data may be stored in storage media according to a different addressing scheme or at different locations than those referred to by command received over I/O bus 420. Thus, map 462 may correlate or otherwise associate addresses or locations of the type or format received over I/O bus 420 with addresses or locations in one or more of storage media 440.

In addition to RAID functionality, other forms of functionality may be implemented with respect to embodiments of a virtual translator storage device. In one embodiment, this functionality may include performing encryption on the data stored on one or more of the storage media associated with the virtual translator storage device. Encrypting data in conjunction with an embodiment of the virtual translator storage device may increase performance of a system with which a virtual translator storage device is utilized (e.g. because no bandwidth is consumed by the operating system for encrypting and decrypting) while simultaneously eliminating a security risk (a compromised operating system or stored data). In a notebook computer setting encrypting at the device level is extremely important for removable storage devices as the devices may frequently be misplaced, stolen or otherwise accessed by unauthorized persons. In the same vein, embodiment of the virtual storage translation device may allow all data on a storage device to be fully encrypted (as opposed to the storage device containing a mix of encrypted and non-encrypted data). A fully encrypted drive provides a greater level of security than a drive that contains non-encrypted and encrypted data.

Figure 5:
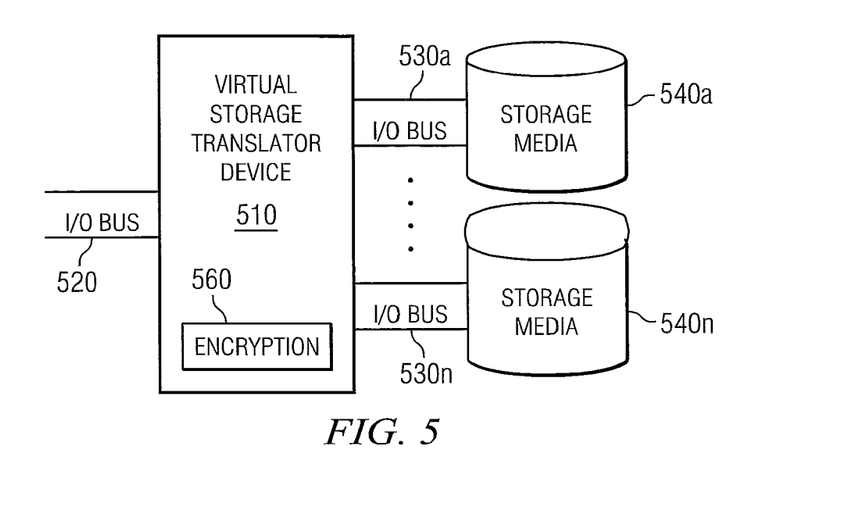
FIG. 5 is a block diagram of one embodiment of a virtual translator storage device.

Turning to FIG. 5, a block diagram for one embodiment of a system for interfacing multiple buses with a single bus is depicted, where encryption may be implemented with respect to data stored on one or more of the storage devices on these multiple buses. More specifically, virtual storage translator device 510 may allow a primary I/O bus 520 to be interfaced with multiple secondary I/O buses 530. Virtual storage translator device 510, includes encryption logic 560 which may be hardware (e.g. on an ASIC), a portion of the hardware or ASIC comprising virtual storage translator device 510, computer readable instructions on a computer readable media, or some combination. Encryption logic 560 may be operable to implement apply one or more encryption algorithms to data being stored to, or retrieved from, storage devices 540 to encrypt according to established standards such as SSL, it could provide low-level whole or partial encryption of a storage device, or it some other function involving an encryption algorithm.

Thus, virtual storage translator device 510 may be operable to receive commands or instructions on primary I/O bus 520 and translate these commands or instructions such that they are effectuated with respect to storage device 540 on secondary I/O buses 530. Additionally, virtual storage translator device 510 is operable to apply encryption logic 560 to any data being stored or retrieved from one or more of these storage devices 540, such that data may be stored on one or more storage device 540 in an encrypted format. As this encryption may take place in virtual storage translator device 510, the encryption process may be more secure than a similar encryption process which is accomplished at the operating system or application level.

As a large degree of functionality has been discussed herein in conjunction with embodiments of a virtual translator storage device it should be pointed out that almost any permutation of embodiments of functionalities discussed herein may be implemented. For example, multiple virtual translator storage devices may be cascaded to achieve varying effects, RAID may be implemented with respect to none or all of the virtual translator storage devices in a particular system, different types of storage devices may be utilized in conjunction with virtual translator storage devices, RAID may be implemented with varying types of storage devices and hardware encryption may be utilized on one or more of these storage devices, etc.

Thus, embodiments of the virtual translator storage device may be employed in storage devices to a variety of advantageous ends. Such storage device may be better understood with reference to FIG. 6 which depicts a block diagram of one embodiment of a storage device which employs a virtual storage translator device. Storage device 600 may be housed in an enclosure 602, which may be an enclosure which conforms to any one of a number of industry standards or which may be a proprietary enclosure designed for use with a particular manufacture's computing systems, etc. The enclosure 602 may house or otherwise comprise an interface 612 operable to couple storage device 600 to a bus such as SATA, PATA, SCSI, PCI or any other type of bus or medium over which commands may be received and responses sent. Virtual storage translator device 630 is coupled to interface 612 through I/O bus 610 such that commands received at interface 612 will be passed to virtual storage translator device 630 on I/O bus 610. It will also be noted that virtual storage translator device 630 may itself comprise interface 612 (for example virtual storage translator device 630 may a card or printed circuit board comprising interface 612), such that I/O bus 610 may not be needed and virtual storage translator device 630 may receive commands from or through interface 612 on the bus to which interface 612 is coupled.

Figure 6:
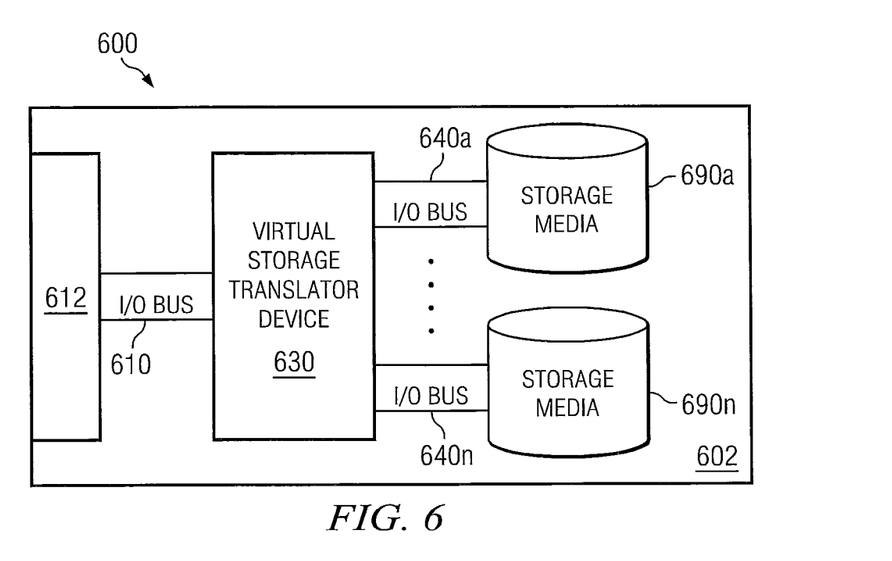
FIG. 6 is a block diagram of one embodiment of a storage device utilizing an embodiment of a virtual translator storage device.

Virtual translator storage device 630 is, in turn, coupled to each of storage media 690 using a corresponding I/O bus 640, which may be a SATA, PATA or other type of bus, including a proprietary bus designed for use with virtual storage translator device 630. Storage media 690 may each be solid state storage (e.g. flash or DRAM-based solid state storage) or may each comprise one or more disk platters, heads and arms as are known in the art, or may be another type of storage media altogether.

Virtual translator storage device 670 may execute the commands received through interface 612 utilizing storage media 690. In other words, in this embodiment, two storage media 690 may be utilized in conjunction with a single interface of a single storage device without altering the BIOS or other software issuing commands over interface 612. In fact, to the issuer of commands through interface 612 it appears as if a single storage device (e.g. hard disk drive, etc.) is present at interface 612. Thus, a wide variety of different objectives may be accomplished using virtual storage translator device 630.

For example, as discussed above, storage media 690 used with embodiments of a virtual translator storage device 630 may be any type of storage devices known in the art, such as spinning media or disk drives, solid state hard drives, optical drives, etc. As may be realized each of these various types of storage devices may have different strengths or weaknesses. For example, spinning media drives may have a higher capacity than solid state hard drives while being susceptible to failure when subject to excessive shock or vibration while conversely solid state media drives may be of comparatively lesser capacity while being more resistant to shock or vibration.

When only a single storage media type is utilized the advantages and disadvantages of the particular type of storage media utilized must be dealt with: if a solid state drive is chosen more resistance to shock and vibration is achieved at the expense of capacity, while if a spinning media drive is chosen capacity is gained by sacrificing durability. Using virtual translator storage device 630, however, multiple storage devices may be utilized in conjunction with I/O bus 610 and by utilizing various or different types of storage devices a variety of objectives may be achieved. For example, if storage device 690a is a solid state storage device and storage device 690n is a spinning disk drive the benefits of a solid state drive (e.g. durability, shock resistance, etc.) may be obtained while simultaneously realizing the benefits of a spinning disk drive (e.g. capacity).

Furthermore, if virtual storage translator device 630 implements RAID level 0 with respect to storage media 690, storage capacity of storage device 600 may effectively be doubled without any alteration to the hardware or software used to interface with the storage device 600 (e.g. relative to a single storage device with a single storage media). In other words, no matter the size of a single storage device using a single storage media which can be coupled to a particular interface or bus, this size can be effectively doubled (or tripled, quadrupled, etc.) by utilizing storage device 600 with multiple storage media 640.

Additionally, certain levels of fault tolerance or recoverability may be achieved without alteration to the BIOS or other software issuing commands by using virtual storage translator device 630 to implement higher levels of RAID (e.g. RAID level 1, 5, etc.) with respect to the multiple storage media 640 of storage device 600 as discussed above. Similarly, encryption may also be achieved without alteration to the BIOS or other software issuing commands by implementing this encryption with respect to virtual storage translator device 630 as also described above.

It should be noted that a wide variety of objectives may be accomplished through the use of embodiments of storage device 600 comprising virtual translator storage devices 630 (e.g. increased speed, data reliability, performance, redundancy, etc.) and that many permutations of various RAID implementations and/or encryption implementations may be possible. For example, no RAID may be implemented with respect to storage media 640, RAID level 0 may be implemented with respect to storage media 640, encryption may be implemented with respect to one or more of storage media 640 on which RAID is implemented, etc.

Figure 7:
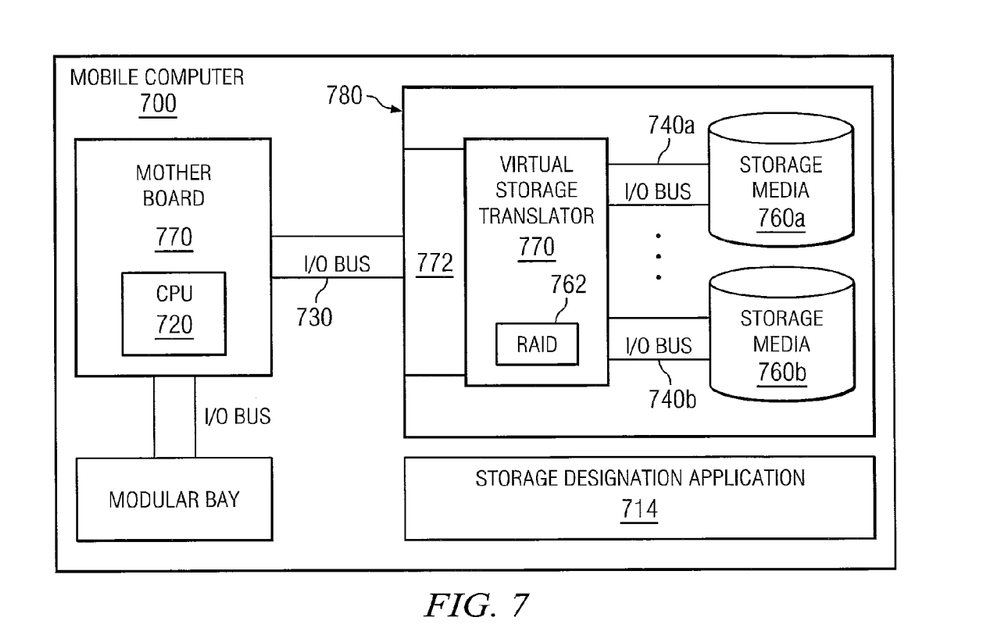
FIG. 7 is a block diagram of one embodiment of a use of a storage device utilizing an embodiment of a virtual translator storage device.

The functionality of an embodiment of storage device such as those discussed above may be better depicted with reference to FIG. 7 which depicts a block diagram of the use of just such an embodiment of a storage device utilizing a virtual storage translator device having a in a mobile computing environment. Mobile computer 700 comprises a mother board 710 with a Central Processing Unit (CPU) 720 where the mother board is coupled to storage device 780 through an I/O bus 730, such as a SATA or other type of bus. Storage device 780 comprises virtual translator storage device 770 having interface 772 operable to interface with I/O bus 730. Virtual translator storage device 770 is, in turn, coupled to each of storage media 760 using a corresponding I/O bus 740, which may also be SATA or other type of bus. One of storage devices 760*a* may be of a first type of storage media such as a disk drive while another of the storage devices 760*b* may be of a second type of storage media such as solid state storage.

Virtual translator storage device 770 may simulate a single drive which is the combined size of storage media 760 by performing or executing the commands received through I/O bus 730 utilizing storage media 760. In addition, virtual translator storage device 770 may ensure that certain designated data is stored on a particular one of the storage media 760 without altering the BIOS or other software executing in conjunction with the mobile computer 700. In fact, to an operating system 700 executing on mobile computer (e.g. executing on CPU of mother board 410) it appears as if a single storage device (e.g. hard disk drive, etc.) is present on I/O bus 730.

As can be seen then, storage capacity corresponding to I/O bus 730 may effectively be increased and the reliability of critical data improved without any substantial alteration to the hardware or software of mobile computer 700 relative to coupling only a single storage device to I/O bus 730. In other words, no matter the size of a single storage device which can be coupled to I/O bus 730, this size can be effectively increased and the storage of critical data on reliable storage media achieved by attaching multiple storage media of different types to virtual translator storage device 770.

As discussed above, storage media 760 used with embodiments of a virtual translator storage device 770 may be any type of storage devices known in the art, such as spinning media or disk drives, solid state hard drives, optical drives, etc. As may be realized each of these various types of storage devices may have different strengths or weaknesses. For example, spinning media drives may have a higher capacity than solid state hard drives while being susceptible to failure when subject to excessive shock or vibration while conversely solid state media drives may be of comparatively lesser capacity while being more resistant to shock or vibration.

When only a single storage device is utilized in a mobile environment the advantages and disadvantages of the particular type of storage device utilized must be dealt with: if a solid state drive is chosen more resistance to shock and vibration is achieved at the expense of capacity, while if a spinning media drive is chosen capacity is gained by sacrificing durability. Using virtual translator storage device 770, however, multiple storage media may be utilized in conjunction with I/O bus 730 and by utilizing various or different types of storage devices a variety of objectives may be achieved. For example, if storage device 960*a* is a solid state storage device and storage device 960*b* is a spinning disk drive the benefits of a solid state drive (e.g. durability, shock resistance, etc.) may be obtained while simultaneously realizing the benefits of a spinning disk drive (e.g. capacity).

To accentuate the advantages of utilizing different types of storage device in conjunction with virtual translator storage device 770 it may be desired to designate where (e.g. on which storage media 760) certain data is stored. For example, it may be useful to store critical or important data on a solid state storage device to protect against loss of this data as these devices are more resistant to shock and vibration. By the same token it may be useful to store non-critical or less important data on a spinning media drive such that the relatively more limited capacity of a solid state storage device is not utilized to store such non-critical data.

Thus, in one embodiment a utility or application 714 may be provided in conjunction with mobile computer 700 (e.g. which may execute on, or utilized with other software such as an operating system or the like on, mobile computer 700) which allows data (e.g. files, directories, etc.) to be designated as critical (or non-critical). Based on a designation associated with data virtual storage translator device 770 may store the data on an appropriate storage media 760. For example, if a file is designated as critical it may be stored on a solid state storage media 760 while if the file is designated as non-critical (or is not designated as critical) the file may be stored on a spinning storage media 760. Again, the storage of data to an appropriate or designated storage media may be accomplished by virtual storage translator device 770 invisibly to a user or the hardware or software of mobile computer 700.

Figure 10:
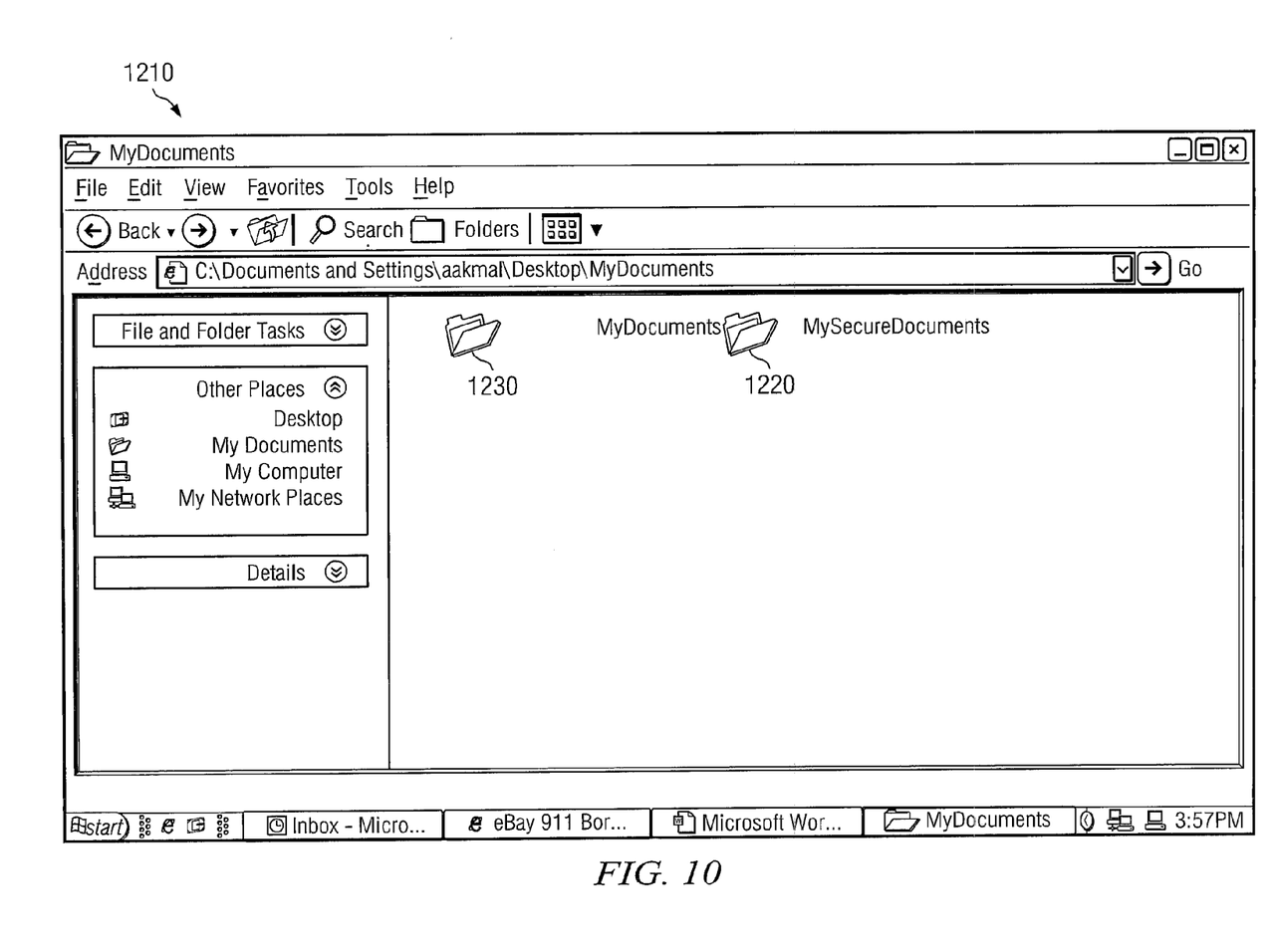
FIG. 10 is a block diagram of one embodiment of interface for allowing the designation of critical data.

In one embodiment, storage designation application 714 (for example, a set of computer executable instructions which may be executed by CPU 720) may automatically designate certain files as critical. For example, with brief reference to FIGURE XXXX, in one embodiment a users "MyDocuments" folder 1210 may have two sub-folders, one sub-folder designated "MySecureDocuments" 1220 and one folder designated "MyDocuments" 1230. Files placed within the "MySecureDocuments" folder will be designated by storage designation application 714 as critical and will be stored on an appropriate storage media 760*a* by virtual translator storage device 770. While files in the "MyDocuments" folder may be stored on another storage media 760*b*. In this way, two or more storage devices 760 may be used in conjunction with a single I/O bus 730 where one of these storage media 760 may be a more reliable storage media 760*a* such as a solid state storage device and the other storage media 760*b* may be a storage media with more capacity. Thus, a user may gain the benefit of the use of both types of storage media without having to substantially alter his mobile computer 700 or utilize a modular bay.

To inform virtual storage translator storage device 470 that a particular file or folder is to be designated as critical, storage designation application 714 may intercept commands to store critical data to be issued over I/O bus 730 and alter such commands to inform virtual storage translator device 770 that the data is to be stored in critical storage or may independently communicate with virtual translator storage device 770 to communicate which folders or files are to be stored on a particular storage device 460.

Virtual translator storage device 770 comprises RAID controller 762 such that RAID may be implemented with respect to commands received on primary I/O bus 730 utilizing storage media 760. In other words, in this embodiment, RAID may be implemented by RAID controller 762 with respect to two storage media 760 in conjunction with an I/O bus 730 designed to interface with only a single storage device without altering the BIOS or other software executing in conjunction with the mobile computer 700. In fact, to an operating system or other software executing on mobile computer 700 (e.g. executing on CPU of mother board 710) it may appear as if a single storage device with a single storage media (e.g. hard disk drive, etc.) is present on I/O bus 730.

As can be seen then, by using storage device 780 RAID may be implemented to accomplish various objectives (increase speed or performance, redundancy, fault tolerance, etc.) without any alteration to the hardware or software of mobile computer 700 (e.g. alteration to the BIOS, operating system, drivers, etc.). It will be apparent after a review of the above that though one embodiment of the storage device has been depicted with respect to a mobile computer, embodiments of such storage devices may be similarly utilized with equal efficacy in other setting (e.g. other types of computing or data storage systems).

Figure 8:
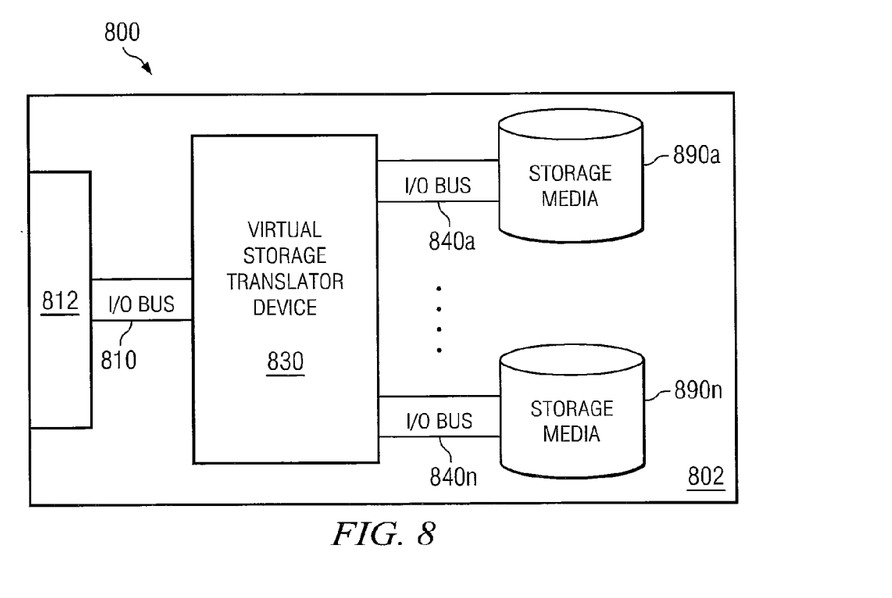
FIG. 8 is a diagrammatic representation of one embodiment of a storage device utilizing an embodiment of a virtual translator storage device.

Similar efficacy and advantages may be achieved by embodiments of a virtual translator storage device in other settings, including those which are not mobile in nature. FIG. 8 depicts a block diagram of one embodiment of a storage device which employs a virtual storage translator device which may, for example, be used in a storage server (or other storage) setting. Storage device 800 may be housed in an enclosure 802, which may be an enclosure which may be a proprietary enclosure designed for use with a particular manufacture's computing systems (e.g. to fit in a slot in manufacturer's storage server), etc. The enclosure 802 may house an interface 812 operable to couple storage device 800 to a bus such as SATA, PATA, SCSI, PCI or any other type of bus or medium over which commands may be received and responses sent, including those buses or mediums proprietary to a particular manufacturer's computing systems, etc. Virtual storage translator device 830 is coupled to interface 812 through I/O bus 810 such that commands received at interface 812 will be passed to virtual storage translator device 830 on I/O bus 810. It will also be noted that virtual storage translator device 830 may itself comprise interface 812 (for example virtual storage translator device 830 may a card or printed circuit board comprising interface 812), such that I/O bus 810 may not be needed and virtual storage translator device 830 may receive commands from through interface 812 on the bus to which interface 812 is coupled.

Virtual translator storage device 830 is, in turn, coupled to each of storage media 890 using a corresponding I/O bus 840, which may be a SATA, PATA or other type of bus, including a proprietary bus designed for use with virtual storage translator device 830. Storage media 890 may each be solid state storage (e.g. flash or DRAM-based solid state storage) or may each comprise one or more hard disks produced by a manufacturers such as those made by Seagate, Western Digital, Maxtor, Hitachi, etc.

Virtual translator storage device 870 may execute the commands received through interface 812 utilizing storage media 890. In other words, in this embodiment, two storage media 890 may be utilized in conjunction with a single interface of a single storage device without altering the BIOS or other software issuing commands over interface 812. In fact, to the issuer of commands through interface 812 it appears as if a single storage device (e.g. hard disk drive, etc.) is being accessed through interface 812. Thus, a wide variety of different objectives may be accomplished using virtual storage translator device 830. For example, as discussed above, storage media 890 used with embodiments of a virtual translator storage device 830 may be any type of storage devices known in the art, such as spinning media or disk drives, solid state hard drives, optical drives, etc. As such, it may be possible to store critical data on an appropriate or desired storage media of storage device 800.

Figure 9:
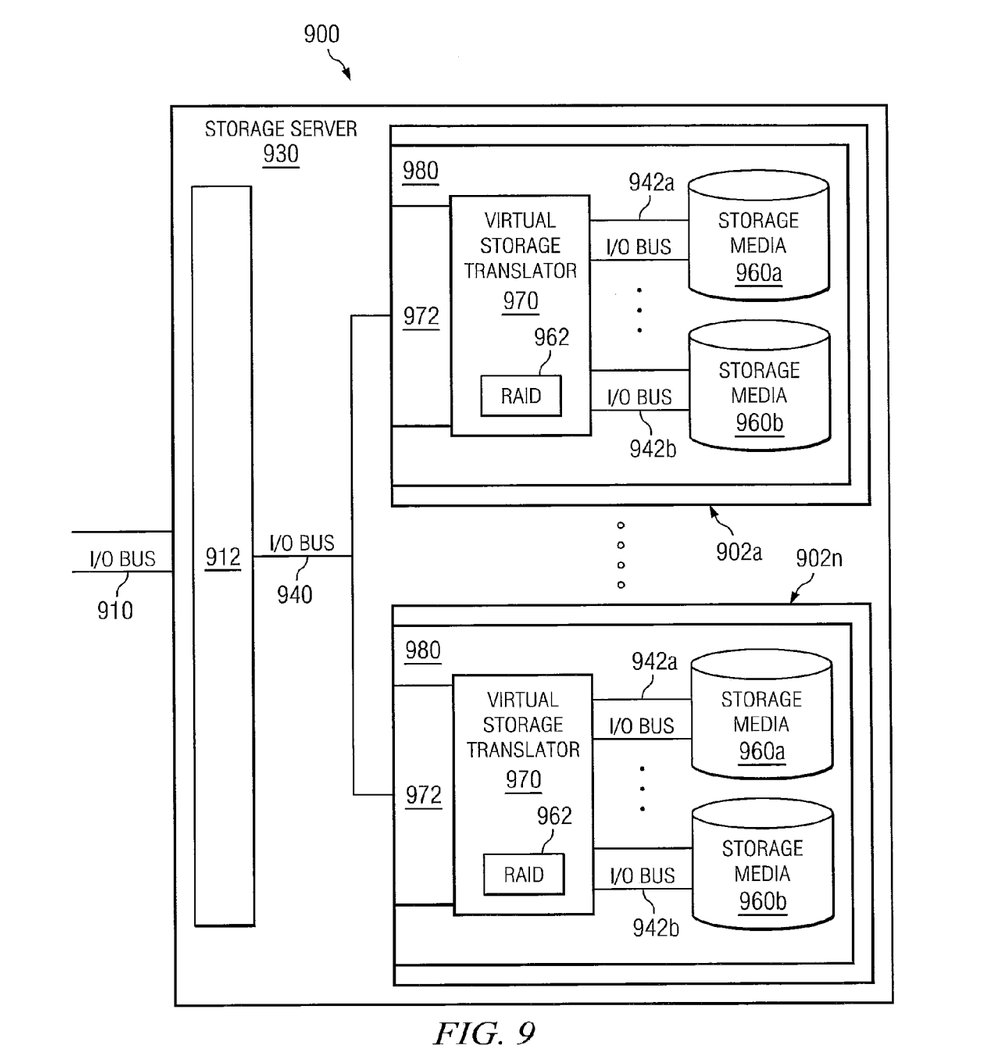
FIG. 9 is a block diagram of one embodiment of a use of a storage device utilizing an embodiment of a virtual translator storage device.

The functionality of an embodiment of storage device such as those discussed above may be better depicted with reference to FIG. 9 which depicts a block diagram of the use of just such an embodiment of a storage device utilizing a virtual storage translator device having a RAID controller in a storage server environment.

Storage system 900 comprises a storage server 930 which receives commands or instructions from one or more hosts (not shown) over I/O Bus 910, which may be a serial or other type of bus. Application(s) or hardware (collectively 912) which implement one or more storage server applications may process the received commands to determine one or more corresponding commands to be issued over one or more I/O buses 940. I/O bus 940 is operable to interface with a plurality of storage slots 902, each of the storage slots 902 itself operable to interface with a storage device where, as described above, the size, interface or other properties of slots 902 may be proprietary to the manufacturer of storage server 930.

Each storage device 980 utilized in conjunction with a storage slot 902 (e.g. plugged into or otherwise interfaced with the storage slot 902) may therefore utilize an enclosure designed for use with that slot 902. In other words, the physical or other attributes of the enclosure (or other portions of) storage device 980 may be configure to function in conjunction with storage slot 902 (or storage server 930). Storage device 980 also comprises virtual translator storage device 970 having interface 972 operable to interface with I/O bus 940. Virtual storage translator device 970 is, in turn, coupled to each of storage media 960 using a corresponding I/O bus 942, which may also be SATA or other type of bus.

One of storage devices 960a may be of a first type of storage media such as a disk drive while another of the storage devices 960b may be of a second type of storage media such as solid state storage. Using virtual translator storage device 970 a single storage device which is the combined size of storage media 960 may be simulated. In addition, virtual translator storage device 970 may ensure that certain designated data is stored on a particular one of the storage media 960 without altering the BIOS or other software executing in conjunction with the storage server 930 as discussed above with respect to a mobile computer. In fact, to an operating system or storage application executing on storage server 930 it may appear as if a single storage device (e.g. hard disk drive, etc.) is present at each of slots 902.

As can be seen then, storage capacity corresponding to slots 902 may effectively be increased and the reliability of critical data improved without any substantial alteration to the hardware or software of storage server 930 relative to coupling only a single storage device to a storage slot 902. In other words, no matter the size of a single storage device which can be used in storage slot 902 this size can be effectively increased and the storage of critical data on reliable storage media achieved by attaching a storage device using virtual translator storage device 970 with multiple storage media of different types to slot 902.

It should be noted that a wide variety of objectives may be accomplished through the use of embodiments of storage device 980 comprising virtual translator storage devices 970 (e.g. reliable storage of data, increased speed, performance, redundancy, etc.) and that many permutations of storage media types, storage of data on these storage media, various RAID implementations or encryption implementations may be possible.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention. For example, it will be noted that many other permutations of use of embodiments of a virtual translator storage device may be implemented.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A storage device, comprising:
an enclosure;
a first interface operable to interface with a first I/O bus of a computing device utilizing a first protocol;
a plurality of second I/O buses utilizing a second protocol, each of the one or more second I/O buses coupled to a corresponding storage media; and
a controller comprising one or more queues operable to store commands received through the first interface, a translator operable to configure a communication in the first protocol or the second protocol wherein the controller is operable to translate a first command received on the first I/O bus to one or more second commands configured to implement the first command in conjunction with the plurality of second I/O buses and corresponding storage media wherein the controller is operable to store data designated as critical on a first storage media of a first size coupled to a first one of the plurality of second I/O buses, store data not designated as critical by a user on a second storage media of a second size coupled to a second one the plurality of second I/O buses and the storage device appears as a single storage device of the combined first and second sizes to the computing device on the first I/O bus, wherein data is designated as critical by the user storing of the data in a first folder using the computing device and data is designated as not critical by the user storing the data in a second folder using the computing device.

2. The storage device of claim 1, wherein each of the corresponding storage media are disk platters, solid state storage media or disk drives.

3. The storage device of claim 2, wherein the first storage media is a solid state storage media.

4. The storage device of claim 3, wherein an enclosure comprises the first interface, the one or more second I/O buses, the corresponding storage media and the controller.

5. The storage device of claim 4, wherein the enclosure is an industry standard size.

6. The storage device of claim 4, wherein the enclosure is a proprietary size.

7. The storage device of claim 3, wherein the controller further comprise a map operable to map an address in commands received on the first I/O bus to one or more addresses corresponding to the one or more storage media coupled to the second I/O buses.

8. The storage device of claim 7, wherein the controller is operable to determine if the address in commands received on the first I/O bus corresponds to data designated as critical.

9. The storage device of claim 3, wherein the first I/O bus and the one or more second I/O buses are a SATA, PATA, SCSI, or FC bus.

10. The storage device of claim 3, further comprising encryption logic operable to implement one or more encryption algorithms in conjunction with the one or more storage media.

11. A method for implementing a storage device, comprising
receiving a first command through a first interface operable to interface with a first I/O bus of a computing device utilizing a first protocol, wherein the storage device comprises a plurality of second I/O buses utilizing a second protocol, a first storage media of a first size coupled to a first one of the plurality of second I/O buses and a second storage media of a second size coupled to a second one the plurality of second I/O buses;
storing the first command in one or more queues operable to store commands received through the first interface;
translating the first command to one or more or more second commands operable to implement the first command utilizing a second protocol such that the storage device appears as a single storage device of the combined first and second sizes to the computing device on the first I/O bus, wherein if the first command corresponds to data designated as critical the one or more second command are operable to utilize the first storage media, if the first command corresponds to data not designated as critical by a user the one or more second commands are operable to utilize the second storage media of a second size coupled to a second one the plurality of second I/O buses and wherein data is designated as critical by the user storing of the data in a first folder using the computing device and data is designated as not critical by the user storing the data in a second folder using the computing device.

12. The method of claim 11, wherein the first storage media and the second storage media are disk platters, solid state storage media or disk drives.

13. The method of claim 12, wherein the first storage media is a solid state storage media.

14. The method of claim 13, wherein the first interface is coupled to an enclosure comprising the first interface, the plurality of second I/O buses and the one or more storage media.

15. The method of claim 14, wherein the enclosure is an industry standard size.

16. The method of claim 14, wherein the enclosure is a proprietary size.

17. The method of claim 13, further comprising mapping an address in commands received on the first I/O bus to one or more addresses corresponding to the first storage media coupled to the first one of the second I/O buses or the second storage media coupled to the second one of the second I/O buses.

18. The method of claim 17, further comprising determining if the address in commands received on the first I/O bus corresponds to data designated as critical.

19. The method of claim 13, wherein the first I/O bus and the plurality of second I/O buses are a SATA, PATA, SCSI, or FC bus.

20. The method of claim 13, further comprising encrypting data in conjunction with the one or more storage media.

* * * * *